US005108698A

United States Patent [19]

Murakami et al.

[11] Patent Number: 5,108,698

[45] Date of Patent: Apr. 28, 1992

[54] METHOD OF MAKING PLATE-SHAPED MATERIAL

[75] Inventors: Masahide Murakami; Akihiko Yanagitani, both of Himeji; Yoshikazu Tanaka, Akashi, all of Japan

[73] Assignee: Sanyo Special Steel Company, Limited, Hyogo, Japan

[21] Appl. No.: 630,491

[22] Filed: Dec. 20, 1990

[30] Foreign Application Priority Data

Mar. 27, 1990 [JP] Japan .................................. 2-80357

[51] Int. Cl.[5] .............................................. B23F 7/00

[52] U.S. Cl. .......................................... 419/6; 419/30; 428/558

[58] Field of Search ....................... 428/558; 419/8, 30

[56] References Cited

U.S. PATENT DOCUMENTS 4,606,883 8/1986 Wizeman et al. ....................... 419/8
4,906,434 3/1990 Ashbee .................................... 419/8
4,999,156 3/1991 Ashbee .................................... 419/8

FOREIGN PATENT DOCUMENTS 1306507 12/1989 Japan .

*Primary Examiner*—Stephen J. Lechert, Jr.
*Attorney, Agent, or Firm*—Morris Fidelman

[57] ABSTRACT

A method of making a disc-shaped or plate-shaped sintered body from powdered material of poor ductility, such as Sendust alloy, wherein the powdered material is filled in a dish-like metallic vessel having a thick bottom wall and a low side wall, a plurality of such filled vessels are piled up and put in a cylindrical capsule made of hot-workable metal, the capsule is charged in a container of a hot extrusion press whose outlet is closed and it is then heated and compressed. The resultant compressed product is taken out and cooled and metallic parts resulted from the vessels and capsule are removed from the compressed product, thereby obtaining plate-shaped sintered bodies as wanted.

9 Claims, 2 Drawing Sheets

METHOD OF MAKING PLATE-SHAPED MATERIAL

TECHNICAL FIELD OF INVENTION

This invention relates to a method of making a plate-shaped material by using a technique of powder metallurgy and, especially, to a method of massproducing plate-shaped product of a material which it is difficult to roll into a plate or to cut into a plate from a block.

BACKGROUND OF INVENTION

In manufacture of circular disc-shaped or square plate-shaped product comprising a material, such as Sendust alloy, cobalt alloy, high class high speed steel or an alloy mainly composed of Laves compound and/or intermetallic compound, which is difficult to be rolled or forged into a plate, it has been a general practice to prepare a round or square billet by casting, then slice it to obtain a circular disc-shaped or square plate-shaped product and, if necessary, grind its sliced surfaces. For example, high density magnetic recording has recently been progressed and Sendust alloy (Fe-Al-Si alloy) sputtering has come into use in manufacture of corresponding better magnetic heads. Since it is very difficult to plastically work this alloy, a target material as a mother material of sputtering has been cut into a plate directly from a billet prepared by casting. Also, in an alloy mainly composed of rare-earth-Fe type Laves compound and used in a recording medium of optomagnetic recording system, a target is cut directly from a cast billet since it is difficult to be plastically worked as in the case of Sendust alloy.

When a material which causes significant segregation in casting is used, it has been tried to cut a billet prepared from a powdered material by using a technique of hot press, hot isotropic press, hydraulic forging press or the like. Moreover, as a method other than slicing, it has been undertaken, since olden times, to hot-press and sinter a thin powder layer into a plate.

In the method of slicing a billet into a number of plate-shaped pieses, the slicing cost is high regardless of the method of preparing the billet and it is further raised due to poor production yield attributable to cutting margins. When the material has especially poor machinability, it is sometimes unable to cut by a conventional tool and it sometimes cracks even by a carbide tool, thereby singnificantly reducing the production yield. When it is sliced by using a special technique such as electrospark machining, electron beam cutting or lasar cutting, it requires a long working time and further reduces its productivity.

In addition, when the abovementioned Sendust alloy or rare-earth/Fe type alloy is cast into a billet, it frequently segregates in the way of solidification and may result in local deviation of composition from its predetermined value or internal gross porosities and cracks which make the billet unusable and widely reduce the production yield. When the casting technique is used, there is fair chance for producing rough crystal grains above one millimeter in the billet. In this case, the billet is so brittle that it is very difficult to cut it into plate-shaped targets and grind them, since cleavage crack occurs easily through the grain.

On the other hand, in the method of preparing a billet or plate-shaped product by hot-pressing a powdered material, there are upper limits or temperature and pressure such as 1,000° C. and 1,000 Kg/cm$^2$ according to industrial practice which is attributable to restriction of hot strength of a pressing die. Therefore, it is difficult to prepare a poreless sintered body of 100% density by hot-pressing for some kind of powdered alloy. When the resultant plate-shaped product including some remaining pores is used as a target material, it may be subjected to such a trouble in that thermal stress is concentrated around the pores to cause cracks therefrom or that a gas as an impurity is discharged from the pores to affect the sputting effect. Moreover, when the plate-shaped product is prepared one by one by hot-pressing, the productivity is further reduced.

In order to remove these troubles, a technique has been developed as disclosed in the Japanese patent opening gazette No. 1-306507. According to this technique, as shown in FIG. 1, powder layers 1 or a material to be formed into plates and partition plates 2 are alternately piled up and contained in a cylindrical capsule 3 made of workable metal and the capsule 3 is tightly closed, heated and then pressed within a die. The product is then cooled and metallic part attributable to the partition plates 2 and capsule 3 is removed. The materials of the capsule 3 and the partition plates 2 preferably have a low affinity to the powder to be treated and easily separable therefrom.

In this method, however, it is difficult to obtain a uniform thickness of the powder layer 1 and, therefore, the resultant plate-shaped product having a diameter of 150 mm, for example, may have an uneven thickness such as 7 mm plus/minus 2 mm and also include pores in its metallic structure.

SUMMARY OF INVENTION

Accordingly, an object of this invention is to provide an improved method of making a high quality plate-shaped material having a uniform thickness and no pore in its structure.

According to this invention, a plurality of shallow vessels each containing a powdered material are piled up and put in a hot-workable metal capsule. Each vessel has a relatively thick and flat bottom wall and a relatively low side wall standing up from the periphery of the bottom wall. The capsule containing the vessels is tightly closed and then heated. The heated capsule is axially compressed in a hot-pressing die. The compressed product is taken out of the die and cooled, and part of the product yielded from the capsule and the vessels is removed to obtain plate-shaped sintered materials.

These and other objects and features of this invention will be described in more detail below with reference to the accompanying drawings.

DESCRIPTION OF PREFERRED EMBODIMENT

Figure 2:
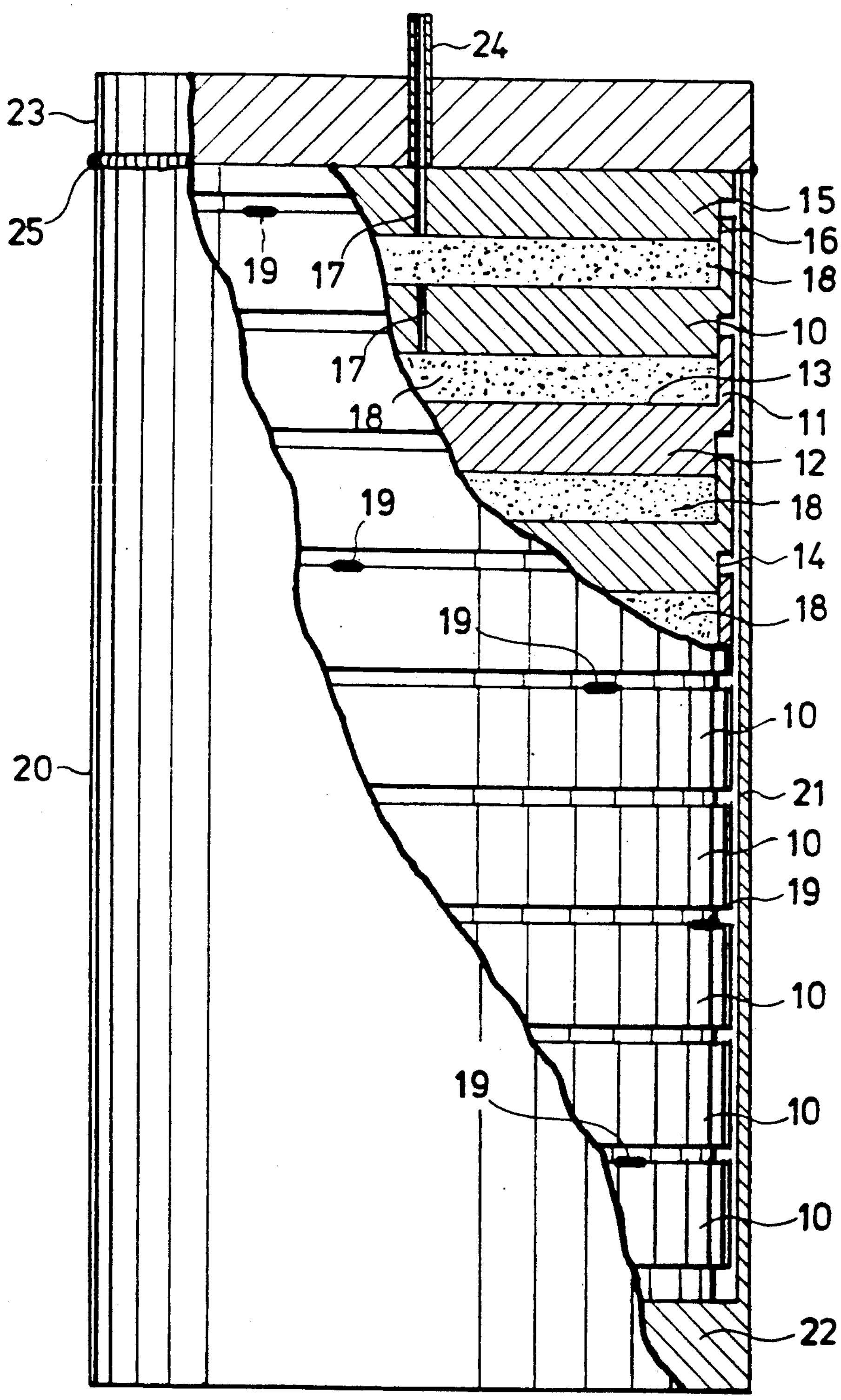
FIG. 2 is a partly sectional side view showing a filled capsule before hot-pressing, which is used in an embodiment of this invention.

Referring to FIG. 2, 10 denotes shallow dish-like vessels each having a cylindrical side wall 11 and a flat bottom wall 12 which form a depression 13 in the upper face. The vessel 10 has a circumferential step 14 at the peripheral corner of its bottom face, which is adapted to engage with the side wall 11 of another vessel 10 when such vessels are piled up as shown. The step 14 of the lowermost vessel may be omitted. The uppermost vessel 10 is provided with an inner cover 15 having the same thickness as the bottom wall 12 and a circumferential step 16 similar to the step 14. Numeral 17 denotes ventilation or degassing holes formed in suitable locations of the bottom wall 12 and the inner cover 15.

The material and size of the vessel 10 and the cover 15 used in a test production were as follows.

Material: SUS-304 steel
Inner diameter: 162 mm
Outer diameter: 159 mm
Depth of depression 13: 15 mm
Thickness of Bottom 12 and cover 15: 20 mm
Height of steps 14 and 16: 3.5 mm where SUS-304 steel is Japanese industrial standard stainless steel containing 18% chromium and 8% nickel. Each vessel 10 was filled with 1,110 grams of powdered Sendust alloy 18 consisting of iron, silicon and aluminium and having a nominal composition of 85%, 9% and 6% by weight, respectively. The powdered alloy was prepared by melting the alloy in a vacuum melting furnace and then sprayed by using an argon gas atomizing method to obtain powdered alloy having average particle size of 150 microns. The resultant powder was filtered through a one millimeter sieve to remove large particles. As filling the powder, the vessel is vibrated to flatten the surface of the powder. The actual composition of the Sendust alloy used in this test production was as follows at percent by weight.

| | | |
|---|---|---|
| C: 0.002 | S: 0.001 | Si: 9.40 |
| Al: 5.75 | Mn: 0.09 | Ti: 0.03 |
| P: 0.012 | Fe: Remainder | |

The filled vessels 10 were piled up as shown and the inner cover 15 was put thereon. The vessels 10 and the cover 15 were mutually coupled by welding at two or three circumferential positions as shown by numerals 19 and then put in a capsule 20.

The capsule 20 had cylindrical side wall 21 and a bottom wall 22 and its upper opening was closed with a cover 23 having an exhaust tube 21. The material and size of the capsule 20 and the cover 23 used in this test production were are as follows.

Material: SUS-304 steel
Outer diameter: 166 mm
Thickness of side wall 21: 1.6 mm
Thickness of bottom 22 and cover 23: 40 mm
Length: 480 mm The cover 23 was welded air-tightly to the capsule 20 containing a pile of the vessels 20 and the capsule 20 was evacuated through the exhaust tube 24 which was thereafter crushed and closed. The evacuate capsule 20 was heated by induction heating at 1,200° C. and then inserted in a hot extrusion press of 172 mm inner diameter whose outlet was closed. Then, the capsule was compressed by a force of 2,000 tons and the compressed capsule was taken out and slowly cooled. The compressed capsule reduced its length to 406 millimeters.

Figure 1:
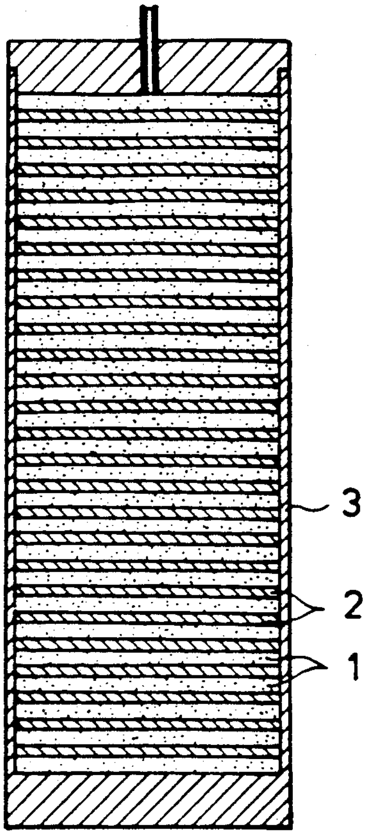
FIG. 1 (PRIOR ART)
FIG. 1 is a sectional side view showing a filled capsule before hot-pressing, which is used in the prior art method.
Figure 3:
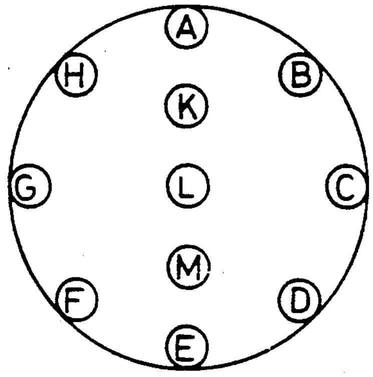
FIG. 3 is a plan view of the product of this embodiment showing thickness measuring positions thereon.

A surrounding shell portion of the compressed capsule was removed by lathe machining and a cylindrical lamination composed of alternately overlapping stainless steel layers yielded from the bottom walls 12 of the vessels 10 and sintered Sendust alloy layers yielded from the powder layers 18 was obtained. These layers could be separated by applying some force and, thus, Sendust alloy discs of 163 mm diameter were obtained. Actual thickness of thereof measured at positions A to M as shown in FIG. 3 was as follows.

| | | | |
|---|---|---|---|
| A: 7.70 mm | B: 7.90 mm | C: 7.88 mm | D: 7.68 mm |
| E: 7.45 mm | F: 7.55 mm | G: 7.52 mm | H: 7.40 mm |
| K: 7.72 mm | L: 7.85 mm | M: 7.65 mm | |

The resultant Sendust alloy disc was microscopically observed and it was found that its structure consisted of fine particles and included no pore. Its density was also measured as very close to 6.96 grams/cm$^3$, the true density of Sendust alloy.

Figure 4:
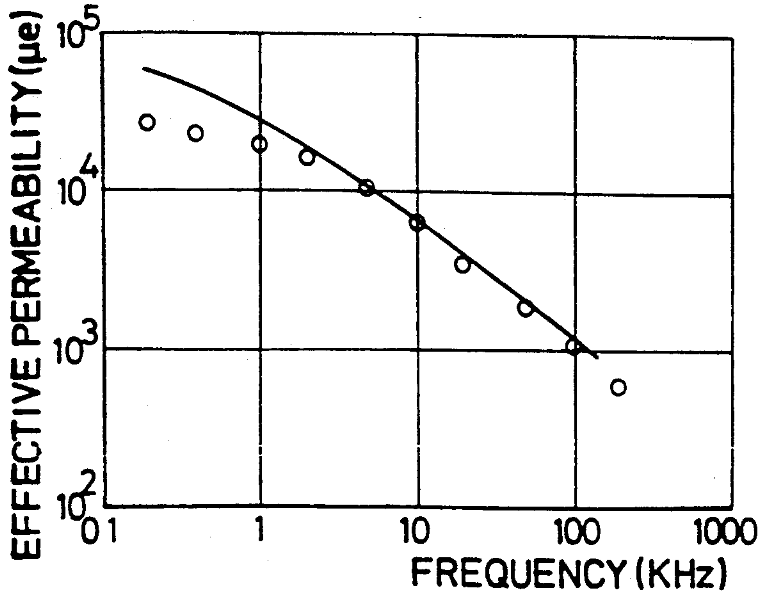
FIG. 4 is a diagram showing a frequency characteristic of effective permeability of the product of this embodiment.

A test piece of 10.0 mm outer diameter, 6.0 mm inner diameter and 0.2 mm thickness was cut from the disc and its frequency characteristic of effective permeability was measured under a magnetic field of 10 millioersteds. The result of measurement is shown by small circles in FIG. 4 and it substantially coincides with a solid characteristic curve of Sendust alloy which is disclosed in a known reference.

The above description of the embodiment has been made for the illustrative purpose only and never intends any limitation to the scope of the invention. It should be noted that various modifications and changes can be added to the abovementioned embodiment without leaving the spirit and scope of the invention as defined in the appended claims. When the inventive method is realized, however, the following attention should be paid in order to obtain the best result.

It is recommendable that the powdered material consists of spherical particles in ordet to obtain higher packing density. Such spherical particles are preferably prepared by using a gap stomizing technique as described above.

The metal capsule 20 is required to deform without breakage when heated and compressed. In order to prevent the sintered product from cracking, the material of the capsule is preferably similar to the sintered powder in deformation resistance, transformation temperature and thermal expansion coefficient. The reason for using a capsule of SUS-304 steel for Sendust alloy in the above embodiment is that both materials have no transformation temperature below the sintering temperature of Sendust alloy and have similar deformation resistance at the sintering temperature. This consideration will not be needed when the capsule has relatively thin wall.

The material of the vessel 10 should have low affinity with the sintered material in order to prevent both materials from reacting with each other to result in mutual adhesion. In order to lateral movement of the vessels 10, the clearance between the vessels and the capsule is preferably as small as possible and it is recommendable to provide engaging means such as the step 14 between resective vessels.

The powdered material filled in each vessel is preferably vibrated together with the vessel in order to raise its apparent density and its filling depth should be uniform at every position. Evacuation of the capsule is preferable but not always necessary. The capsule may be heated by any means other than induction heating. such as high temperature gas heating or electric resistance heating. Although the efficiency of induction heating of powdered material is generally low, the induction heating in this invention is effected efficiently by the aid of induced heat of the vessels. The heating temperature under pressure applied may be lower that the sintering temperature under no pressure.

It is recommendable to use a hidraulic forging press or the abovementioned hot extrusion press for applying a compessive force and this force should be sufficiently higher than conventional hot-pressing force and may be above 2 tons per square centimeter.

What is claimed is:

1. A method of making a plate-shaped high density sintered body of poor ductility material comprising steps of filling each of a plurality of dish-like metallic vessels with a predetermined amount of powder of said poor ductility material, each said vessel having a thick bottom wall and a low side wall standing up from the periphery of said bottom wall, piling up said plurality of vessels and putting them in a cylindrical capsule made of hot-workable metal, heating and compressing said capsule, cooling the compressed product and removing therefrom metallic part yielded from said capsule and vessels.

2. A method as set forth in claim 1 wherein said poor ductility material is an (Fe-Al-Si) containing alloy and said capsule and vessels are made of stainless steel.

3. A method as set forth in claim 1 wherein said powder of poor ductility material consists of spherical particles prepared by using an atomizing technique.

4. A method as set forth in claim 1 wherein said method further includes a step of evacuating said capsule before said heating and compressing step.

5. A method as set forth in claim 1 wherein said pile up vessels are mutually coupled by welding.

6. A method as ser forth in claim 1 wherein said heating is effected by induction heating and said compression is effected by using a hot extrusion press whose outlet is closed.

7. A method as set forth in claim 1 wherein said vessels include means for engaging themselves with each other when they are piled up.

8. A method as set forth in claim 1 wherein said step of filling a vessel with powder includes a step of vibrating said vessel to flatten the surface of said powder.

9. A method as set forth in claim 1 wherein the materials of said vessels and said powder have a low mutual affinity and similar deformation resistance, transformation temperature and thermal expansion coefficient.

* * * * *